(12) United States Patent
Na

(10) Patent No.: US 6,637,891 B2
(45) Date of Patent: Oct. 28, 2003

(54) OPTICAL SYSTEM OF LIQUID CRYSTAL PROJECTOR

(75) Inventor: Man Ho Na, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/996,716

(22) Filed: Nov. 30, 2001

(65) Prior Publication Data

US 2002/0080331 A1 Jun. 27, 2002

(30) Foreign Application Priority Data

Dec. 2, 2000 (KR) .................... 2000-0072708

(51) Int. Cl.[7] .................. G03B 21/14; G03B 21/28; G03B 21/00; G02F 1/1335
(52) U.S. Cl. .................. 353/33; 353/20; 353/81; 349/9
(58) Field of Search .................. 353/31, 20, 33, 353/34, 37, 81; 349/5, 8, 9

(56) References Cited

U.S. PATENT DOCUMENTS

| | | | | |
|---|---|---|---|---|
| 6,101,041 A | * | 8/2000 | Ishibashi et al. | 359/634 |
| 6,113,239 A | * | 9/2000 | Sampsell et al. | 353/31 |
| 6,384,972 B1 | * | 5/2002 | Chuang | |
| 6,419,362 B1 | * | 7/2002 | Ikeda et al. | 353/20 |
| 6,490,087 B1 | * | 12/2002 | Fulkerson et al. | |

* cited by examiner

Primary Examiner—Rodney Fuller
Assistant Examiner—Melissa Koval
(74) Attorney, Agent, or Firm—Fleshner & Kim, LLP

(57) ABSTRACT

Disclosed is an optical system for a liquid crystal projector enabling to minimize a size of the optical system and a count of optical parts constructing the optical system using three pieces of reflective type liquid crystal displays. Accordingly, the present invention simplifies the optical system, thereby enabling to reduce a cost of production as well as a span length of the optical system.

23 Claims, 4 Drawing Sheets

OPTICAL SYSTEM OF LIQUID CRYSTAL PROJECTOR

BACKGROUND OF THE INVENTION

1. Field of the Invention

The present invention relates to a liquid crystal projector, and more particularly, to an optical system for a liquid crystal projector enabling to minimize a size of the optical system and a count of optical parts constructing the optical system using three pieces of reflective type liquid crystal displays.

2. Background of the Related Art

Lately, a projector, which magnifies and projects a small image to a large screen, attracts attention as a flat display enabling to realize a large-sized screen with a slim design instead of a cathode ray tube having a large volume and a limited screen size. The projector as a display constructing a small screen image uses a cathode ray tube or a liquid crystal display(hereinafter abbreviated LCD), and particularly, a liquid crystal projector using LCD prevails for the trend of slim size. The liquid crystal projector generally uses a backlit or reflective LCD. Such a liquid crystal display has been developed on the basis of small size, lightness, and high brightness, while an LCD panel has been developed on the basis of high opening ratio and high resolution. In order to cope with the trends of the liquid crystal projector such as high resolution, small size, and low price, a reflective type LCD panel is widely used for the liquid crystal projector.

The liquid crystal projector realizes an image on an LCD panel using light emitted from a light source and images a video pf the LCD panel on a screen using a projecting optical system, whereby the video imaged on the screen is appreciated. When the projector is constructed in a manner that the image of the LCD panel is directly projected to a rear screen, a projection distance between the screen and the projecting optical system should be provided so that a sufficient space behind the screen is essential. Hence, the projector becomes thickened so as to make it difficult to reduce the volume of the projector. In order to settle such a problem, a total reflection mirror is inserted between the screen and projecting optical system so as to fold a light path. Thus, a thickness of the projector is reduced. Although it is also able to reduce the thickness of the projector further by decreasing an arranged angle of the total reflection mirror, there is a limit to reduce the arranged angle of the total reflection mirror and the projecting optical system so as to project the image on the rear screen without distortion. Besides, there is a limitation to reducing the thickness of the optical system including an illumination system, LCD, and a projecting lens system due to the natural span length of the system itself.

FIG. 1 illustrates a diagram of an optical system for a liquid crystal projector according to a related art.

Referring to FIG. 1, a liquid crystal projector according to a related art includes first and second fly eye lenses (hereinafter abbreviated FEL) 6 and 8 arranged between a light source 4 and a total reflection mirror 14, a polarizing beam split array(hereinafter abbreviated PBS array) 10, a first light-concentrating lens 12, and a second light-concentrating lens 16 arranged between the total reflection mirror 14 and a first dichroic mirror 18. A white light irradiated from a lamp of the light source 4 is reflected by an elliptical mirror so as to proceed toward the first FEL 6. The first FEL 6 divides the incident light into cell units so as to be focused on the respective lens cells of the second FEL 8. The second FEL 6 transforms the incident light into the parallel light in parallel with a specific part so as to transmit toward the PBS array. The PBS array 10 separates the incident light into linear polarized lights having specific optical axes respectively, i.e. a P polarized light and an S polarized light, and a ½ wavelength plate(not shown in the drawing) attached to a rear of the PBS array 10 in part transforms the transmitted P polarized light into the S polarized light. Hence, the incident light is entirely transformed into the S polarized light by the PBS array 10 so that the light irradiated from the light source 4 becomes incident on liquid crystal panels 26R, 26G, and 26B mostly. The first light-concentrating lens 12 concentrates the incident light from the PBS array 10 on the total reflection mirror 14, and the total reflection mirror 14 totally reflects the incident light from the first light-concentrating lens 12 so as to make the reflected light proceed toward the second light-concentrating lens 16. The second light-concentrating lens 16 concentrates the incident light from the total reflection mirror 14 upon the first dichroic mirror 18. The first dichroic mirror 18 transmits a blue area of the incident light as well as reflects green and red areas of the incident light of which wavelengths are longer than that of the blue light.

The optical system for the liquid crystal projector includes a second dichroic mirror 20 arranged between the first dichroic mirror 18 and the red liquid crystal panel 26R, a first polarizing film 22R, a first polarizing beam split prism (hereinafter abbreviated PBSP) 24R, a second polarizing film 22G and a second PBSP 24G arranged between the second dichroic mirror 20 and the green liquid crystal panel 26G, a first relay lens 27 arranged between the first dichroic mirror 18 and the blue liquid crystal panel 26B, a second total reflection lens 28, a second relay lens 29, a third polarizing film 22B, a third PBSP 24B, a dichroic prism 30 arranged between the first to third PBSPs 24R, 24G, and 24B, and a projecting lens 32 installed to confront a light-projecting surface of the dichroic prism 30. The second dichroic mirror 20 reflects a green region light of the incident light reflected on the first dichroic mirror 18 so as to make the reflected green region light proceed toward the second polarizing film 22G and transmits a red region light to proceed toward the first polarizing film 22R. The second total reflection mirror 28 reflects an incident blue region light transmitted through the first dichroic mirror 18 to proceed toward the third polarizing film 22B. In this case, the first and second relay lens 27 and 29 as field lenses relay an imaging point of the blue region light so as to make the imaging point re-imaged on the blue liquid crystal panel 26B. The first to third polarizing films 22R, 22G, and 22B transmit just the S polarized lights in parallel with the corresponding optical axes of the polarizing films to make the S polarized lights proceed to the first to third PBSPs 24R, 24G, and 24B, respectively. The first to third PBSPs 24R, 24G, and 24B reflect the red, green, and blue S polarized lights, which are transmitted through the first to third polarized films 22R, 22G, and 22B and then become incident, to proceed toward the red, green, and blue liquid crystal panels 26R, 26G, and 26B, respectively. Moreover, the first to third PBSPs 24R, 24G, and 24B acquires image information from the red, green, and blue liquid crystal panels 26R, 26G, and 26B respectively so as to transmit the red, green, and blue lights transformed into the P polarized lights to proceed toward the dichroic prism 30. The red, green, and blue liquid crystal panels 26R, 26G, and 26B as reflective type liquid crystal panels transform the incident S polarized lights reflected upon the first to third PBSPs 24R, 24G, and 24B into the P polarized lights respectively in accordance with the image signal, thereby realizing an image. The dichroic prism 30 composes the incident red, green, and blue lights by acquiring the image information form the red, green, and blue liquid crystal panels 26R, 26G, and 26B respectively so as to project the composed light through the projecting surface toward the projecting lens 32. First and second polarizing transform films(not shown in the drawing) are arranged between the first and third PBSPs 24R and 24B and the dichroic prism 30, respectively, so as to transform the P polarized lights into the S polarized lights. Hence, the dichroic prism 30 reflects red and blue lights of the S polarized light component incident through the first and second polarizing transform films toward the projecting lens 32 as well as transmits the green light of the P polarized light component incident through the second PBSP 24G toward the projecting lens 32, thereby composing an image of red, green, and blue lights. The projecting lens 32 magnifies to project the image incident from the dichroic prism 30 on a screen.

The above-constructed liquid crystal projector according to the related art uses three pieces of liquid crystal panels, thereby requiring a plurality of dichroic mirrors to separate a whit light from a light source into red, green, and blue lights. Moreover, the liquid crystal projector according to the related art uses the reflective type liquid crystal panels, thereby requiring a plurality of polarizing beam split prisms making different paths of the incident/projected lights by taking the reflective type liquid crystal panel as a reference. The optical system for such a liquid crystal projector using three pieces of the reflective liquid crystal panels according to the related art requires excessive optical parts so as to increase a size of the optical system. Therefore, there is a limitation to reducing a thickness of the system proportional to the span length of the optical system, thereby having difficulty in providing a slim size.

In order to decrease the span length of the optical system, lately proposed is an optical system having a double-layered structure that a color separating part is formed on a color composing part and a projecting lens system. Unfortunately, such a double-layered optical system uses an excessive number of optical parts, thereby having difficulty in reducing a size of the optical system.

SUMMARY OF THE INVENTION

Accordingly, the present invention is directed to an optical system for a liquid crystal projector that substantially obviates one or more problems due to limitations and disadvantages of the related art.

An object of the present invention is to provide an optical system for a liquid crystal projector reducing a number of optical parts as well as a size of the optical system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in an optical system for a liquid crystal projector composing monochromatic images realized in first to third reflective liquid crystal panels respectively for enlarging projection of the composed images, the optical system according to the present invention includes a light source emitting a white light, an illumination part transforming the white light into a predetermined linearly-polarized light and releasing the linearly-polarized light, a first color select transforming to polarize the linearly-polarized light released from the illumination part into another linearly-polarized light in accordance with a wavelength region, and a color resolution/composition part splitting an incident light from the first color select in colors to be incident on the first to third reflective liquid crystal panels respectively and composing the light of which image information is acquired from the first to third liquid crystal panels to release the composed light to a projecting lens system for the enlarging projection, wherein the first to third liquid crystal panels are arranged to confront first to third faces of the color resolution/composition part in part, wherein the projecting lens system is arranged to confront a fourth face of the color resolution/composition part in part, and wherein the first color select is arranged to confront another portion of the same face of the third liquid crystal panel.

Preferably, the color resolution/composition part comprises first to fourth same-sized blocks bonded one another.

Preferably, the first to fourth blocks are bonded to each other using UV rays. More preferably, each of the first to fourth blocks has a triangular cylindrical figure.

Preferably, the color resolution/composition part includes a first dichroic coating face coated on a contact face between the first and second blocks to separate a first color light from the incident light from the first color select, a first polarizing beam split coating face coated on a contact face between the second and third blocks to split a transmitted light from the first dichroic coating face into second and third color lights by polarization so as to make the second and third color lights incident on the first and second liquid crystal panels, respectively, the first polarizing beam split coating face making the polarized second and third color lights proceed to the projecting lens system by acquiring image information from the first and second liquid crystal panels, a second polarizing beam split coating face coated on a contact face between the first and fourth blocks to reflect the first color light from the first dichroic coating face to become incident on the third liquid crystal panel, the second polarizing beam split coating face transmitting the first color light of which image information is acquired from the third liquid crystal panel, and a second dichroic coating face coated on a contact face between the third and fourth blocks so as to transmit the second and third color lights from the first polarizing beam split coating face to the projecting lens system, the second dichroic coating face reflecting the first color light from the second polarizing beam split coating face to the projecting lens system.

More preferably, the first and second dichroic coating faces reflect a blue light and transmit green and red lights, and the first and second polarizing beam split coating faces reflect an S-polarized light and transmits a P-polarized light.

Preferably, the color resolution/composition part further includes first and second anti-reflection coating faces coated on faces confronting the first color select and the projecting lens system respectively to prevent reflective lights, respectively.

Preferably, the color resolution/composition part includes color-transmitting dichroic coating faces coated on faces confronting the first to third liquid crystal panels respectively to transmit the color lights of the corresponding wavelength regions, respectively.

Preferably, the optical system further includes a second color select transforming the lights proceeding between the color resolution/composition part and the projecting lens system into a P-polarized light when a P-polarizing screen transmitting the P-polarized light only is used as a screen on which a composed image enlarged/projected by the projecting lens system is imaged.

More preferably, the first and second color selects transforms a green light by polarization and transmits other lights of rest wavelengths intact, the first color select transforms a green S-polarized light into a P-polarized light and transmits red and blue S-polarized lights intact, and the second color select transforms a green S-polarized light into a P-polarized light and transmits red and blue P-polarized lights intact.

In another aspect of the present invention, in an optical system for a liquid crystal projector composing monochromatic images realized in first to third reflective liquid crystal panels respectively for enlarging projection of the composed images, the optical system includes a light source emitting a white light, an illumination part transforming the white light into a predetermined linearly-polarized light and releasing the linearly-polarized light, a first color select transforming to polarize the linearly-polarized light released from the illumination part into another linearly-polarized light in accordance with a wavelength region, a color resolution/composition part constructed with first to fourth blocks bonded each other and having the same size, the color resolution/composition part splitting an incident light from the first color select in colors to be incident on the first to third reflective liquid crystal panels respectively and composing to release the light of which image information is acquired from the first to third liquid crystal panels, and a second color select transforming the green light of the linearly-polarized lights released from the color resolution/composition part by polarization and transmitting the rest of the lights having other wavelengths so as to release the lights to the projecting lens system for the enlarging projection, wherein the first to third liquid crystal panels are arranged to confront first to third faces of the color resolution/composition part in part, wherein the projecting lens system is arranged to confront a fourth face of the color resolution/composition part in part, and wherein the first color select is arranged to confront another portion of the same face of the third liquid crystal panel.

Preferably, the color resolution/composition part includes a first dichroic coating face coated on a contact face between the first and second blocks to separate a blue color light from the incident light from the first color select, a first polarizing beam split coating face coated on a contact face between the second and third blocks to split a transmitted light from the first dichroic coating face into red and green color lights by polarization so as to make the red and green color lights incident on the first and second liquid crystal panels, respectively, the first polarizing beam split coating face transmitting and reflecting the polarized red and green color lights by acquiring image information from the first and second liquid crystal panels, a second polarizing beam split coating face coated on a contact face between the first and fourth blocks to reflect the blue color light from the first dichroic coating face to become incident on the third liquid crystal panel, the second polarizing beam split coating face transmitting the blue color light of which image information is acquired from the third liquid crystal panel, and a second dichroic coating face coated on a contact face between the third and fourth blocks so as to transmit the red and green color lights transmitted/reflected through/from the first polarizing beam split coating face to the second color select, the second dichroic coating face reflecting the blue color light transmitted through the second polarizing beam split coating face to the second color select.

Preferably, the first and second dichroic coating faces reflect the blue color light and transmit the green and red color lights.

More preferably, the first and second polarizing beam split coating faces reflect an S-polarized light and transmits a P-polarized light.

Preferably, the color resolution/composition part further comprising first and second anti-reflection coating faces coated on faces confronting the first color select and the projecting lens system respectively to prevent reflective lights.

Preferably, the color resolution/composition part further includes color-transmitting dichroic coating faces coated on faces confronting the first to third liquid crystal panels respectively to transmit the color lights of the corresponding wavelength regions, respectively.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
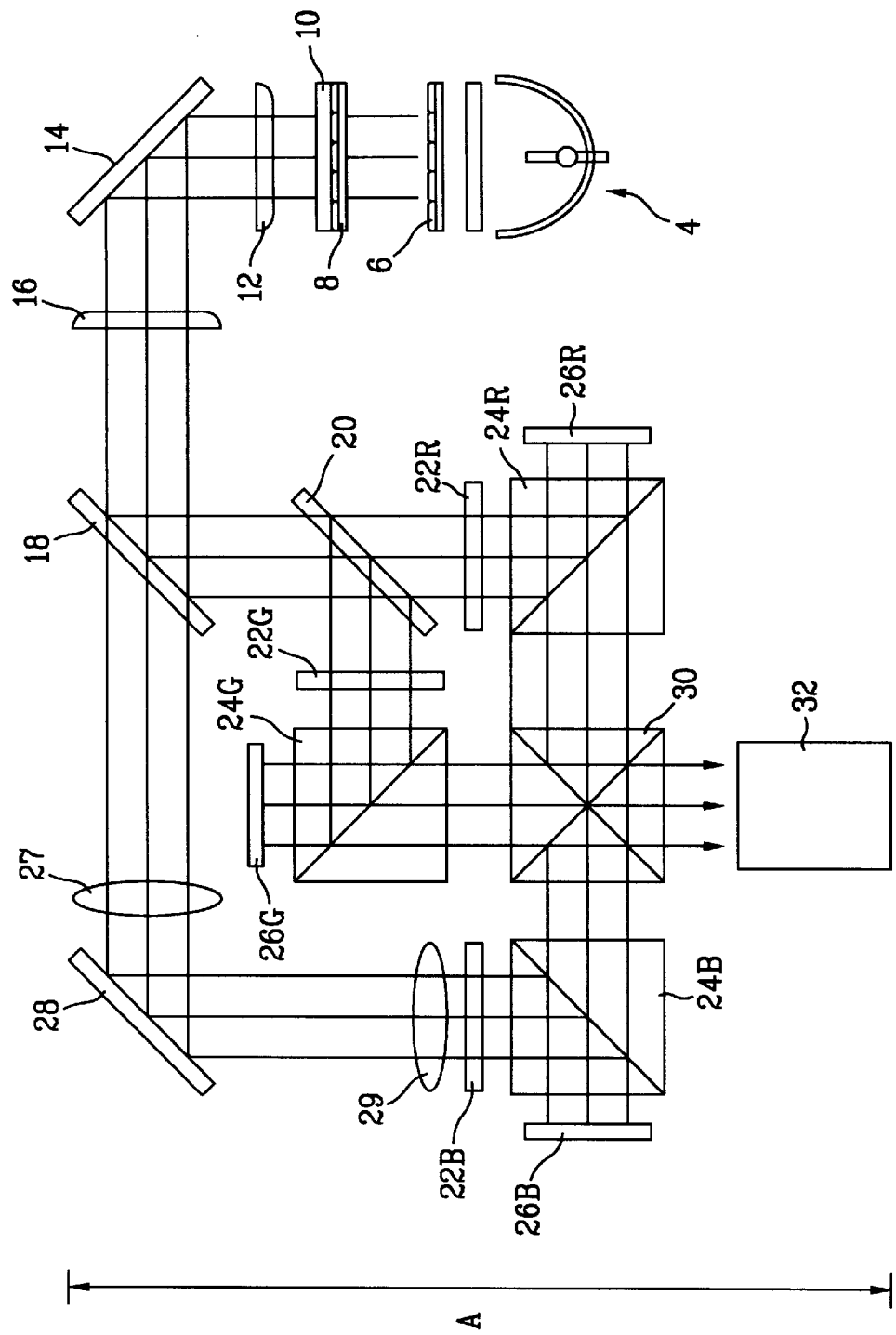
FIG. 1 illustrates a diagram of an optical system for a liquid crystal projector according to a related art.
Figure 2:
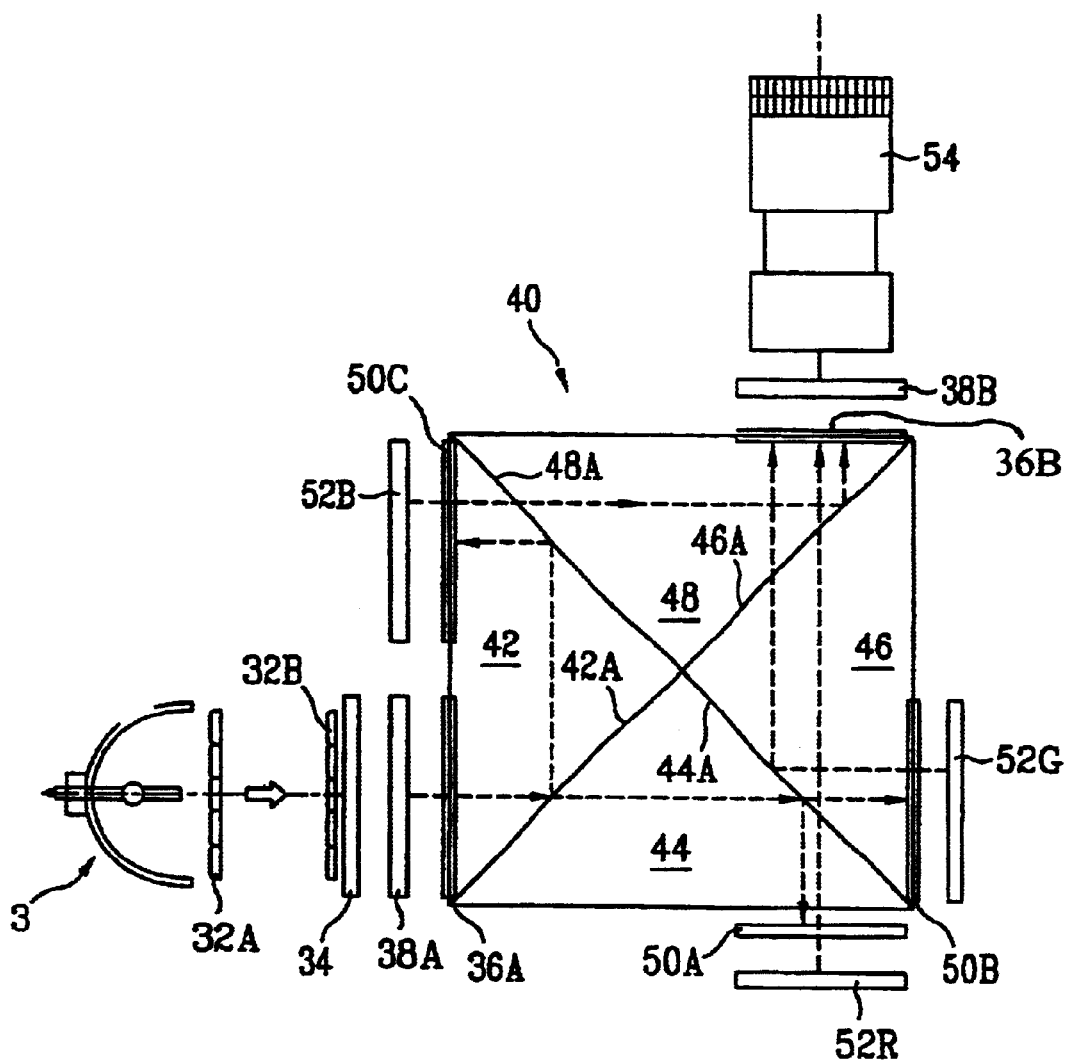
FIG. 2 illustrates a diagram of an optical system for a liquid crystal projector according to an embodiment of the present invention.
Figure 4:
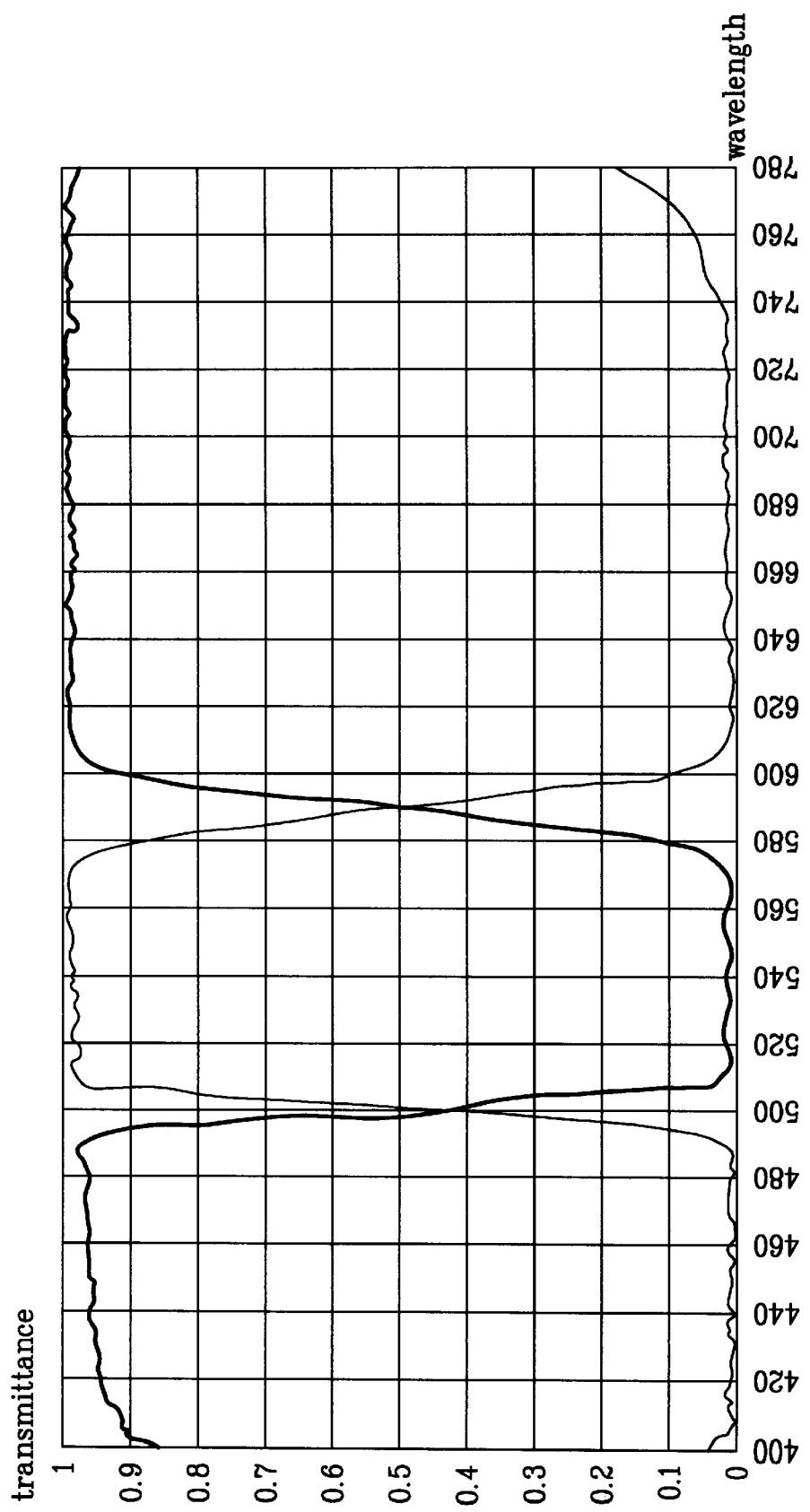
FIG. 4 illustrates a graph of a transmittance characteristic of a first color select shown in FIG. 2.

FIG. 2 illustrates a diagram of an optical system for a liquid crystal projector according to an embodiment of the present invention. Referring to FIG. 2, an optical system includes three pieces of reflective LCDs 52R, 52G, and 52B, an illumination part constructed with first and second FELs 32A and 32B and a PBS array 34 so as to irradiate a white light from a light source 30 to the LCDs 52R, 52G, and 52B uniformly and effectively, a dichroic prism 40 constructed with four blocks 42, 44, 46, and 48 having different coated surfaces for light composition and resolution, a first color select 38A arranged on a light path between the illumination part and the dichroic prism 40, and a projecting lens 54 arranged at a projecting side of the light composed by the dichroic prism 40. The white light projected from the light source 30 proceeds toward the first FEL 32A. The first FEL 32A divides the incident light into cell units to be focused on the respective lens cells of the FEL 32B. The second FEL 32B transforms the incident light into the parallel light in parallel with a specific part. The PBS array 34 is built in one body with the second FEL 32B so as to separate the incident light into P and S polarized lights having a predetermined optical axis, and a ½ wavelength plate(not shown in the drawing) attached to a rear of the PBS array 34 in part transforms the transmitted P polarized light into the S polarized light. A first focusing lens 36A concentrates lights. Such an illumination part makes the incident light transformed into the linearly polarized light in one direction, i.e. the S polarized light, to be incident on the liquid crystal panels 52R, 52G, and 52B uniformly, thereby enabling to increase a light efficiency. The first color select 38A makes the S polarized light, which is incident from the PBS array 34, polarized selectively in accordance with the corresponding wavelength region. For instance, the first color select 38A rotates a green light at 90° so that the S polarized light is transformed into the P polarized light, while transmitting the red and blue lights with maintaining the S polarization. For such an operation, the first color select 38A, as shown in FIG. 4, has an excellent characteristic of transmittance for the green light(P polarization) transformed by polarization and the red and blue lights(S polarization) transmitted without polarization.

Figure 3A:
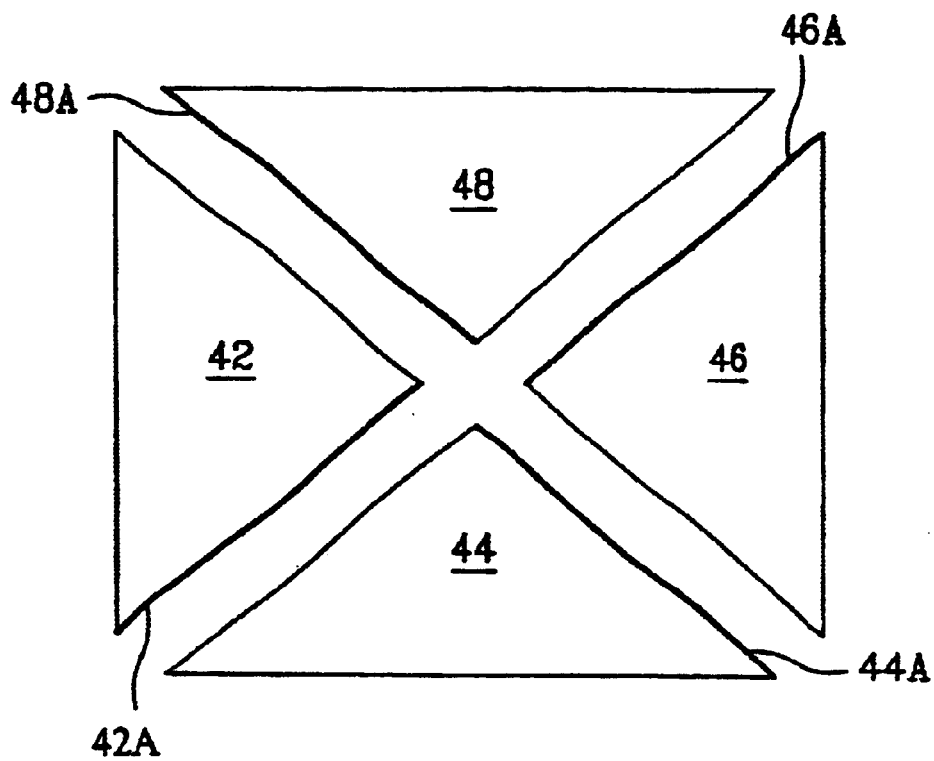
FIG. 3A and FIG. 3B illustrate a process for fabricating a dichroic prism shown in FIG. 2.
Figure 3B:
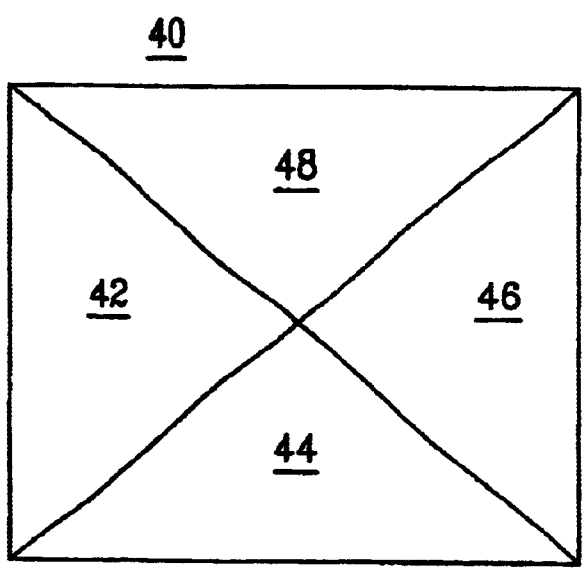

The dichroic prism 40, as shown in FIG. 3A and FIG. 3B, is constructed with the four triangular cylindrical blocks 42, 44, 46, and 48 each of which cross-section is triangular.

FIG. 3A and FIG. 3B illustrate a process for fabricating a dichroic prism shown in FIG. 2.

First, as shown in FIG. 3A, four blocks 42, 44, 46, and 48 are prepared. Two slant faces of one of the four blocks 42, 44, 46, and 48 to be contacted with another neighboring blocks are coated to have different characteristics each other. In detail, dichroic coating faces having different color separating characteristics are formed at a contact face between the first and second blocks 42 and 44 and between the third and fourth blocks 46 and 48, respectively. And, polarizing beam split coating faces are formed at contact faces between the second and third blocks 44 and 46 and another contact faces between the fourth and first blocks 48 and 42, respectively. For instance, first and second dichroic coating faces 42A and 46A are formed at right slant faces of the first and third blocks 42 and 46, respectively. And, first and second polarizing beam split coating faces 44A and 48A are formed at right slant surfaces of the second and fourth blocks 44 and 48. Then, the first to fourth blocks 42, 44, 46, and 48 prepared separately, as shown in FIG. 3B, are bonded together using UV rays so as to complete the dichroic prism 40.

In the dichroic prism 40, the first dichroic coating face 42A coated on the contact face between the first and second blocks 42 and 44 splits the light incident through the first color select 50A. The first dichroic coating face 42A reflects the blue S polarized light of the incident light but transmits the red S and green P polarized lights. The green P and red S polarized lights having been transmitted through the first dichroic coating face 42A become split at the first polarizing beam split coating face 44A coated on the contact face between the second and third blocks 44 and 46. The first polarizing beam split coating face 44A transmits the green P polarized light to proceed to the green LCD panel 52G, and reflects the red S polarized light to proceed to the red LCD panel 52R. Moreover, the first polarizing beam split coating face 44A acquires red image information from the red LCD panel 52R so as to transmit the red P polarized light having been transformed by polarization, and acquires green image information from the green LCD panel 52G to reflect the green S polarized light having been transformed by polarization. The blue S polarized light having been reflected upon the first dichroic coating face 42A is reflected on the second polarizing beam split coating face 48A coated on the contact face between the first and fourth blocks 42 and 48 to proceed to the blue LCD panel 52B. The second polarizing beam split coating face 48A reflects the incident blue S polarized light reflected on the first dichroic coating face 42A to the blue LCD panel 52B, and acquires blue image information from the blue LCD panel 52B to transmit the blue P polarized light having been transformed by polarization. The second dichroic coating face 46A coated on the contact face between the third and fourth blocks 46 and 48 transmits the red P and blue S polarized lights incident from the first polarizing beam split coating face 44A toward the projecting lens 54 as well as reflects the blue P polarized light incident from the second polarizing beam split coating face 48A toward the projecting lens 54. In this case, each of the red, green, and blue LCD panels 52R, 52G, and 52B as a reflective type LCD panel realizes the corresponding color according to an image signal using the incident light. Besides, each of the LCD panels 52R, 52G, and 52B transforms a linearly polarized light in one direction into the other linearly polarized light in another direction in accordance with the corresponding image information so as to project the transformed linearly polarized light. The projecting lens system 54 magnifies to project the composed image incident from the second dichroic coating face 46A of the prism 40 on a screen.

Meanwhile, the optical system shown in FIG. 2 further includes anti-reflection coating faces 36A and 36B at the dichroic prism 40 confronting the first color select 38A and the projecting lens 54 respectively so as to prevent reflective lights. Moreover, red, green, and blue transmitting filters 50A, 50B, and 50C are further formed at portions of the dichroic prism 40 confronting the red, green, and blue LCD panels 52R, 52G, and 52B, respectively, so as to increase color purity. Each of the color transmitting filters 50A, 50B, and 50C may further include an anti-reflection material to prevent the reflective light.

Besides, the optical system shown in FIG. 2 further includes a second color select 38B between the dichroic prism 40 and projecting lens 54. The second color select 38B P-polarizes the entire light incident on the projecting lens 54. In other words, the second color select 38B transforms the green S polarized light incident from the dichroic prism 40 into the P polarized light by the rotation of 90°, while transmitting the red and blue P polarized lights as they are. Thus, a P polarizing screen aligns the polarizing components of the light incident on the projecting lens 50 to the P polarization, and transmits the P polarized lights to a projection screen on which a video magnified by the projecting lens is imaged. In this case, the P polarizing projection screen absorbs external lights, thereby enabling to improve a contrast.

Accordingly, the optical system for a liquid crystal projector according to the present invention includes the color select carrying out a polarizing transformation in accordance with a corresponding wavelength and the dichroic prism constructed with the first to fourth blocks bonded to each other and having coating faces of different characteristics, thereby enabling to remarkably reduce the numbers of dichroic mirrors for light split and the PBSs for light composition.

As mentioned in the above description, the optical system for a liquid crystal projector according to the present invention includes the color select and the dichroic prism constructed with a plurality of coating faces of different characteristics, thereby enabling to remarkably reduce the numbers of optical parts for light composition/resolution. Accordingly, the present invention simplifies the optical system, thereby enabling to reduce a cost of production as well as a span length of the optical system.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An optical system for a liquid crystal projector composing monochromatic images realized in first to third reflective liquid crystal panels respectively for enlarging projection of the composed images, the optical system comprising:
    a light source emitting a white light;
    an illumination part transforming the white light into a predetermined linearly-polarized light and releasing the linearly-polarized light;
    a first color selector transforming to polarize the linearly-polarized light released from the illumination part into another linearly-polarized light in accordance with a wavelength region; and
    a color resolution/composition part having four triangular prism blocks joined together and having coated surfaces having different characteristics, the color resolution/composition part splitting an incident light from the first color selector in colors to be incident on the first to third reflective liquid crystal panels respectively and composing the light of which image information is acquired from the first to third liquid crystal panels to release the composed light to a projecting lens system for the enlarging projection,
    wherein the first to third liquid crystal panels are arranged to confront first to third faces of the color resolution/composition part in part, wherein the projecting lens system is arranged to confront a fourth face of the color resolution/composition part in part, and wherein the first color selector is arranged to confront another portion of the same face of the third liquid crystal panel.

2. The optical system of claim 1, wherein the color resolution/composition part comprises first to fourth same-sized blocks bonded one another.

3. The optical system of claim 2, wherein the first to fourth blocks are bonded to each other using UV rays.

4. The optical system of claim 2, wherein each of the first to fourth blocks has a triangular prism figure.

5. The optical system of claim 2, the color resolution/composition part comprising:
    a first dichroic coating face coated on a contact face between the first and second blocks to separate a first color light from the incident light from the first color selector;
    a first polarizing beam splitting coating face coated on a contact face between the second and third blocks to split a transmitted light from the first dichroic coating face into second and third color lights by polarization so as to make the second and third color lights incident on the first and second liquid crystal panels, respectively, the first polarizing beam splitting coating face making the polarized second and third color lights proceed to the projecting lens system by acquiring image information from the first and second liquid crystal panels;
    a second polarizing beam splitting coating face coated on a contact face between the first and fourth blocks to reflect the first color light from the first dichroic coating face to become incident on the third liquid crystal panel, the second polarizing beam splitting coating face transmitting the first color light of which image information is acquired from the third liquid crystal panel; and
    a second dichroic coating face coated on a contact face between the third and fourth blocks so as to transmit the second and third color lights from the first polarizing beam splitting coating face to the projecting lens system, the second dichroic coating face reflecting the first color light from the second polarizing beam splitting coating face to the projecting lens system.

6. The optical system of claim 5, wherein the first and second dichroic coating faces reflect a blue light and transmit green and red lights.

7. The optical system of claim 5, wherein the first and second polarizing beam splitting coating faces reflect an S-polarized light and transmit a P-polarized light.

8. The optical system of claim 2, the color resolution/composition part further comprising first and second anti-reflection coating faces coated on faces confronting the first color selector and the projecting lens system respectively to reduce reflective lights.

9. The optical system of claim 2, the color resolution/composition part comprising color-transmitting dichroic coating faces coated on faces confronting the first to third liquid crystal panels respectively to transmit the color lights of the corresponding wavelength regions, respectively.

10. The optical system of claim 1, further comprising a second color selector transforming the lights proceeding between the color resolution/composition part and the projecting lens system into a P-polarized light when a polarizing screen transmitting the P-polarized light only is used as a screen on which a composed image enlarged/projected by the projecting lens system is imaged.

11. The optical system of claim 10, wherein the first and second color selector transform a green light by polarization and transmits other lights of rest wavelengths intact.

12. The optical system of claim 10, wherein the first color selector transforms a green S-polarized light into a P-polarized light and transmits red and blue S-polarized lights intact.

13. The optical system of claim 10, wherein the second color selector transforms a green S-polarized light into a P-polarized light and transmits red and blue P-polarized lights intact.

14. The optical system of claim 1, wherein the color resolution/composition part comprises a single dichroic prism.

15. The optical system of claim 1, the color resolution/composition part comprising:
    a first dichroic coating face coated on a contact face between the first and second blocks to separate a first color light from the incident light from the first color selector; and
    a second dichroic coating face coated on a contact face between the third and fourth blocks so as to transmit the second and third color lights to the projecting lens system, the second dichroic coating face reflecting the first color light to the projecting lens system.

16. In an optical system for a liquid crystal projector composing monochromatic images realized in first to third reflective liquid crystal panels respectively for enlarging projection of the composed images, the optical system comprising:

an illumination part transforming received light into a predetermined linearly-polarized light and releasing the linearly-polarized light;

a first color selector transforming to polarize the linearly-polarized light released from the illumination part into another linearly-polarized light in accordance with a wavelength region;

a color resolution/composition part constructed with first to fourth blocks bonded each other and having the same size, the color resolution/composition part splitting an incident light from the first color selector in colors to be incident on the first to third reflective liquid crystal panels respectively and composing to release the light of which image information is acquired from the first to third liquid crystal panels; and a second color selector transforming a first color light of the linearly-polarized lights released from the color resolution/composition part by polarization and transmitting the rest of the lights having other wavelengths so as to release the lights to the projecting lens system for the enlarging projection, wherein the first to third liquid crystal panels are arranged to confront first to third faces of the color resolution/composition part in part, wherein the projecting lens system is arranged to confront a fourth face of the color resolution/composition part in part, and wherein the first color selector is arranged to confront another portion of the same face of the third liquid crystal panel.

17. The optical system of claim 16, the color resolution/composition part comprising:

a first dichroic coating face coated on a contact face between the first and second blocks to separate a blue color light from the incident light from the first color selector;

a first polarizing beam splitting coating face coated on a contact face between the second and third blocks to split a transmitted light from the first dichroic coating face into red and green color lights by polarization so as to make the red and green color lights incident on the first and second liquid crystal panels, respectively, the first polarizing beam splitting coating face transmitting and reflecting the polarized red and green color lights by acquiring image information from the first and second liquid crystal panels;

a second polarizing beam splitting coating face coated on a contact face between the first and fourth blocks to reflect the blue color light from the first dichroic coating face to become incident on the third liquid crystal panel, the second polarizing beam splitting coating face transmitting the blue color light of which image information is acquired from the third liquid crystal panel; and a second dichroic coating face coated on a contact face between the third and fourth blocks so as to transmit the red and green color lights transmitted/reflected through/from the first polarizing beam splitting coating face to the second color selector, the second dichroic coating face reflecting the blue color light transmitted through the second polarizing beam splitting coating face to the second color selector.

18. The optical system of claim 17, wherein the first and second dichroic coating faces reflect the blue color light and transmit the green and red color lights.

19. The optical system of claim 17, wherein the first and second polarizing beam splitting coating faces reflect an S-polarized light and transmit a P-polarized light.

20. The optical system of claim 18, wherein the color resolution/composition part further comprising first and second anti-reflection coating faces coated on faces confronting the first color selector and the projecting lens system respectively to reduce reflective lights.

21. The optical system of claim 16, the color resolution/composition part further comprising color-transmitting dichroic coating faces coated on faces confronting the first to third liquid crystal panels respectively to transmit the color lights of the corresponding wavelength regions, respectively.

22. In an optical system for a liquid crystal projector composing monochromatic images realized in first to third reflective liquid crystal panels respectively for enlarging projection of the composed images, the optical system comprising:

a light source emitting a white light;

an illumination part transforming the white light into a predetermined linearly-polarized light and releasing the linearly-polarized light;

a first color selector transforming the linearly-polarized light released from the illumination part into another linearly-polarized light in accordance with a wavelength region;

a color resolution/composition part constructed with first to fourth blocks bonded each other and having the same size, the color resolution/composition part splitting an incident light from the first color selector in colors to be incident on the first to third reflective liquid crystal panels respectively and composing to release the light of which image information is acquired from the first to third liquid crystal panels; and a second color selector transforming the linearly-polarized lights released from the color resolution/composition part into other linearly-polarized lights by polarization in accordance with wavelength regions so as to release the lights to the projecting lens system for the enlarging projection, wherein the first to third liquid crystal panels are arranged to confront first to third faces of the color resolution/composition part in part, wherein the projecting lens system is arranged to confront a fourth face of the color resolution/composition part in part, and wherein the first color selector is arranged to confront another portion of the same face of the third liquid crystal panel, and wherein the color resolution/composition part further comprises:

a first dichroic coating face coated on a contact face between the first and second blocks to separate a first color light from the incident light from the first color selector;

a first polarizing beam splitting coating face coated on a contact face between the second and third blocks to split a transmitted light from the first dichroic coating face into second and third color lights by polarization so as to make the second and third color lights incident on the first and second liquid crystal panels, respectively, the first polarizing beam splitting coating face transmitting and reflecting the polarized second and third color lights by acquiring image information from the first and second liquid crystal panels;

a second polarizing beam splitting coating face coated on a contact face between the first and fourth blocks to reflect the first color light from the first dichroic coating face to become incident on the third liquid crystal panel, the second polarizing beam splitting coating face transmitting the first color light of which image information is acquired from the third liquid crystal panel; and a second dichroic coating face coated on a contact face between the third and fourth blocks so as to transmit the second and third color lights transmitted/reflected through/from the first polarizing beam splitting coating face to the second color selector, the second dichroic coating face reflecting the first color light transmitted through the second polarizing beam splitting coating face to the second color selector.

23. In an optical system for a liquid crystal projector composing monochromatic images realized in first to third reflective liquid crystal panels respectively for enlarging projection of the composed images, the optical system comprising:

an illumination part transforming received light into a predetermined linearly-polarized light and releasing the linearly-polarized light;

a first color selector transforming the linearly-polarized light released from the illumination part into another linearly-polarized light in accordance with a wavelength region;

a color resolution/composition part splitting an incident light from the first color selector in colors to be incident on the first to third reflective liquid crystal panels respectively and composing the light of which image information is acquired from the first to third liquid crystal panels to release the composed light to a projecting lens system for the enlarging projection, wherein the first to third liquid crystal panels are arranged to confront first to third faces of the color resolution/composition part in part, wherein the projecting lens system is arranged to confront a fourth face of the color resolution/composition part in part, and wherein the first color selector is arranged to confront another portion of the same face of the third liquid crystal panel; and a second color selector transforming the lights proceeding between the color resolution/composition part and the projecting lens system into a P-polarized light when a P-polarizing screen transmitting the P-polarized light only is used as a screen on which a composed image enlarged/projected by the projecting lens system is imaged.

* * * * *